June 14, 1966 W. M. ZINGG ETAL 3,256,181
METHOD OF MIXING A PUMPABLE LIQUID
AND PARTICULATE MATERIAL
Filed May 9, 1962 2 Sheets-Sheet 2

INVENTORS.
Warren M. Zingg
Cleve W. Stoskopf
BY

Charles L Lunford
AGENT

United States Patent Office 3,256,181
Patented June 14, 1966

3,256,181
METHOD OF MIXING A PUMPABLE LIQUID AND PARTICULATE MATERIAL
Warren M. Zingg and Cleve W. Stoskopf, Tulsa, Okla., assignors to The Dow Chemical Company, Midland, Mich., a corporation of Delaware
Filed May 9, 1962, Ser. No. 193,516
10 Claims. (Cl. 252—8.55)

This invention relates to a method and apparatus for the continuous mixing of two or more materials, particularly the mixing of a liquid with a particulated material.

In the mixing of materials, it has long been known to use a batch method wherein two or more materials are agitated together in a container. A batch-mix mixing operation has one particular advantage, in that mixing can be continued until the degree required is obtained. Consequently, if the mechanics of the mixing be inefficient, the inefficiency can be overcome by continuing the operation until the mixture is satisfactory. However, batch mixing requires a sufficiently large container to contain all the final product, or else it requires repeated filling, mixing and emptying. A preferable concept is continuous mixing, with attendant input of ingredients into the apparatus and output of mixture; here, the degree of mixing must be continuously satisfactory, or the purpose of the operation is defeated.

A need for an efficient method of continuously mixing large amounts of liquids and particulated solids arose with improvements in acidizing and fracturing stimulation treatments of petroleum or other earth wells. In the treatment of wells, a liquid such as water, acid, crude oil, or a semirefined oil, and a propping agent, such as sand, particulated walnut shells or other solids are mixed together and pumped into fractures in the fluid bearing formations of the earth. The mixture of liquid and propping agent, in amounts often totaling over 50,000 gallons per treatment, are pumped continuously into the earth at rates as high as 3,000 gallons or more per minute, with the concentration of propping agent being varied from ½ pound to 3 pounds or over per gallon of treating agent fluid as the operation proceeds. Continuous mixing of the liquid and the solid, rather than batch mixing, is desired in view of the changing proportions of liquid and solids which may be required during the treatment. Also, batch mixing would require storage facilities for the mixed product prior to pumping it into the well. This is eliminated with continuous mixing, as the mixed product is pumped into the well as it is mixed.

A further need in well treating operations arises from the fire hazard existing when oil, especially crude oil containing light fractions, is used in the liquid component of the mixture comprising the treating agent. The light fractions escape from the crude oil in the mixing equipment presently known when the oil and the particulated solid are brought together, introducing the possibility of a flash fire from ignition of the vapors reaching the exhaust stacks of the engines driving the mixer and pumps. Thus, there is a need for a safe method of mixing liquids which are prone to lose flammable vapors.

Accordingly, a primary object of the invention is to provide an improved mixing method and apparatus for continuously and rapidly intermixing a liquid and a particulated solid.

A further object of the invention is to provide an improved mixing method and apparatus wherein a flammable liquid of low flash point may be handled safely with little or no loss of vapors.

A further object is to provide an improved mixer which is low in self-contained inventory, and wherein rapid changes may be effected in the volume of the materials being mixed while maintaining predetermined proportions of the components.

A further object is to provide an improved mixer which produces a slurry and which develops a positive flow pressure useful for moving the slurry to other equipment without requiring a pump or the like.

A further object is to provide an improved continuous mixer wherein the mechanism may continue to be operated, even though the delivery line from the mixer has been closed or otherwise stopped off.

A further object is to provide an improved mixer which will automatically and continuously produce a liquid-solids mixture having a predetermined density.

In accordance with the broad concept of this invention, there is provided an impeller which is disposed within a circular housing having a peripheral outlet and at least one peripheral inlet, in addition to an eye inlet opposite the suction face (along the longitudinal axis) of the impeller. Mixing of a fluid and a particulated solid or solids is accomplished by rotation of the impeller within the housing while fluid is supplied into the peripheral inlet with less pressure head than that inherently generated within the mixer while solids are supplied through the eye of the impeller; the mixed liquid and solids are delivered from the peripheral outlet of the casing.

The enumerated objects and advantages and others residing in the invention will be apparent from the following description, taken in connection with the accompanying drawings in which.

Figure 1:
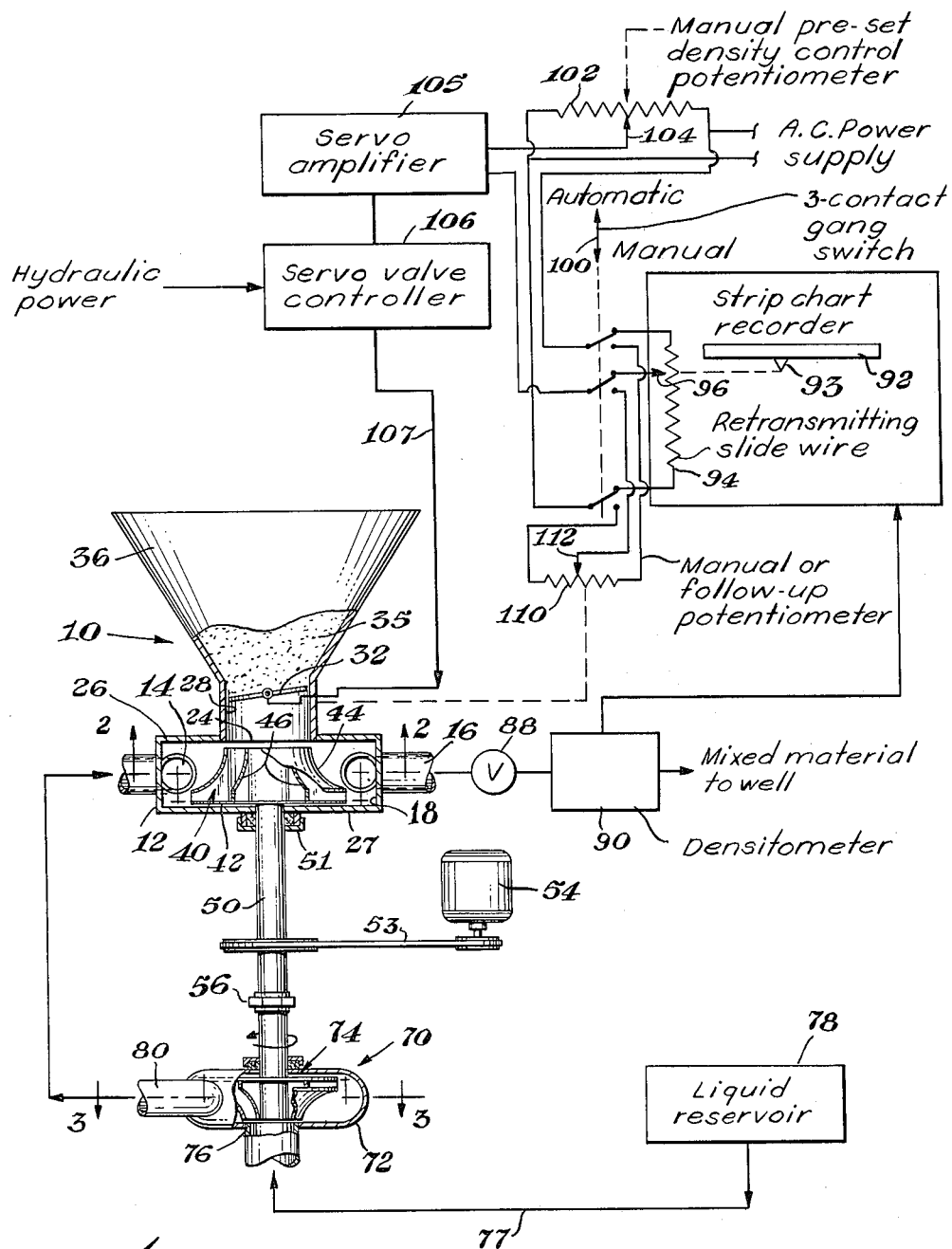
FIGURE 1 is a side elevational view, partially in section, and diagrammatical view of the mixing apparatus fitted with a hopper to aid in the introduction of the solids, and with a pumping means, consisting of a centrifugal pump, coupled thereto to indicate one embodiment of a means of supplying liquid to the apparatus.
Figure 2:
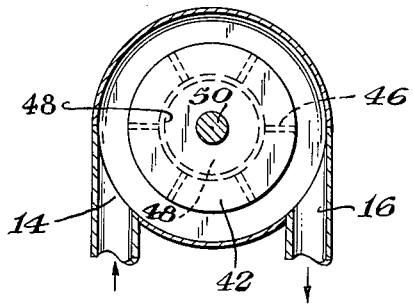
FIGURE 2 is a sectional view taken along line 2—2 of FIGURE 1.
Figure 3:
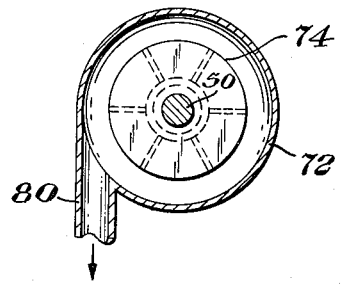
FIGURE 3 is a sectional view taken along line 3—3 of FIGURE 1.

Referring to the drawings in detail and particularly to FIGURES 1, 2 and 3, there is shown a slurry mixing apparatus, illustrated generally by the number 10, which comprises a generally cylindrically shaped housing 12 provided with an inlet 14 for pumpable liquids and an outlet 16. The inlet 14 is so disposed that material pumped through it into housing 12 is directed more or less tangentially along the inner peripheral surface 18 of the housing, flowing circumferentially within the housing to outlet 16, which also is disposed more or less tangentially along the inner peripheral surface 18 and which is disposed essentially opposite to inlet 14.

The housing 12 has an upper end wall 26 with bore 24 disposed therein coaxially with the longitudinal axis of the housing 12. Connecting to wall 26 at bore 24 is conduit 28 having an inner diameter equal to that of bore 24. A butterfly valve 32 is mounted within conduit 28 as a means of regulating the passageway of conduit 28 from fully closed to fully open by conventional operation of the valve 32.

A hopper 36 is connected to conduit 28 to form a continuous passageway for material introduced into the hopper through the bore 24 to within housing 12.

An impeller 40 is disopsed within housing 12 coaxially with the longitudinal axis of the housing 12. The impeller 40 has a lower base plate 42 and a spaced-apart generally frusto-conical cover plate 44, within which are uniformly disposed a plurality of radial vanes 46. An aperture 48, being the open ended top of the frusto-conical plate 44, is disposed below the conduit 28 and is at least as large in diameter as the conduit 28, forming an eye opening into the interior of the impeller 40 and giving communication to passageways between vanes 46 and the passageway of bore 24 and connecting conduit 28. The lower part of the frusto-conical plate 44 is spaced from the base plate 42 and is connected thereto by an array of vanes 46 which extend from the outer edge of the base plate inwardly to a point below the conduit 28.

A shaft 50 is centrally connected to the side of the impeller base plate 42 which is opposite the side to which the vanes 46 are attached, the connection being coaxial with respect to the longitudinal axis of the impeller and extends through a mating bore and packing gland 51 in the lower wall 27 of housing 12 and is rotationally powered through connection by belt 53 with the motor 54.

By means of a shaft connector 56 the motor 54 may be connected also to a centrifugal pump, generally indicated by the number 70. Pump 70 is a conventional centrifugal pump comprising a housing 72 which has an impeller 74 disposed therein. The housing 72 is equipped with a bore 76 through which liquid, as from reservoir 78, may be admitted to the pump 70 through line 77. Operation of the pump delivers liquid through outlet 80 from whence it flows, as shown schematically in FIGURE 1 to inlet 14 of the mixer 10.

The mixer 10 is operated by rotationally driving impeller 40 as liquid is supplied via inlet 14 and particulated solids 35, via hopper 36, to the "eye" of the impeller 40. The mixer commingles the solids and the liquid and delivers the mixture from outlet 16. In well treating operations, the mixture is then supplied to the inlet of positive displacement piston pumps (not shown) which displace the mixture into earth formations via a well bore (not shown).

The mixture leaving outlet 16 passes through a conventional density measuring apparatus 90 wherein gamma rays from a radioactive source are attenuated in proportion to the density of the mixture of liquid and solids which pass through the device. An electrical signal is generated by the gamma rays in proportion to the attenuation thereof. The signal is fed to a conventional strip chart recorder 92 calibrated to give a visual reading of density according to the signal strength and simultaneously record by a stylus 93 on a moving chart paper a continuing record of the mixture density.

Incorporated within recorder 92 is a retransmiting slidewire 94, having a movable contact 96 which is mechanically linked to the recording stylus 93 whereby the setting of contact 96 is determined by the slurry density. The retransmitting slidewire 94 is connected through three-gang switch 100 when positioned to "automatic" into a bridge circuit with density control potentiometer 102. The slidewire contact 104 of potentiometer 102 is movable manually along a scale calibrated in density and during operation of the mixer 10, the contact 104 is manually set to the density desired for the liquid-solids mixture. If the mixture produced by mixer 10 varies from the setting of contact 104, the electrical signal from the density measuring device 90 causes a setting of contact 96 which will create an imbalance in the bridge circuit and transmit an electrical signal to the servo-amplifier 105. The signal is amplified and transmitted to the hydraulically powered servo valve controller 106, which is mechanically linked (as indicated by dash line 107) to the mixer flow control valve 32. The controller opens or closes the butterfly valve 32 at the base of the hopper 36 to allow more or less solids to enter mixer 10 and increase or decrease the density of the mixture, depending upon the nature of the signal from the densitometer 90. As the mixture with a changed density passes through the density measuring device 90, the change in density results in a resetting of contact 96 on the retransmitting slidewire 94 and, when the density reaches that predetermined by the manual setting of density control potentiometer 102, the bridge circuit is balanced and no further signal is generated.

Manual control of the density control system may be achieved using the circuit illustrated schematically in FIGURE 1 by changing the setting of the switch 100 from "automatic" to manual. When this is done, the retransmitter slidewire 94 is disconnected from the bridge circuit and the manual follow-up potentiometer 110 is connected into the bridge circuit. The slide contact 112 of potentiometer 110 is mechanically linked to the flow control valve 32 in such a fashion that the setting contact 112 on the slidewire is proportional to the degree of opening of the valve 32. In operation, the density of the mixture produced by the mixer is visually read from the strip chart recorder 92 and, if the density is not that which is desired, then a corrective change is made in the setting of contact 104 on potentiometer 102 in order to open or close valve 32, as need be, by activation through an unbalance signal to the servo-amplifier 105 and to the hydraulically powered servo valve controller 106 in the same fashion as if the control system were being operated with switch 100 in the "automatic" position.

Figure 4:
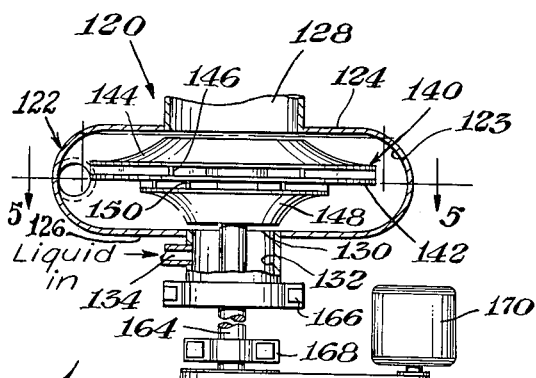
FIGURE 4 is a side elevational view, in section, of an alternative embodiment of this invention wherein the mixing apparatus and a centrifugal pump are constructed in combination in the purview of the invention.
Figure 5:
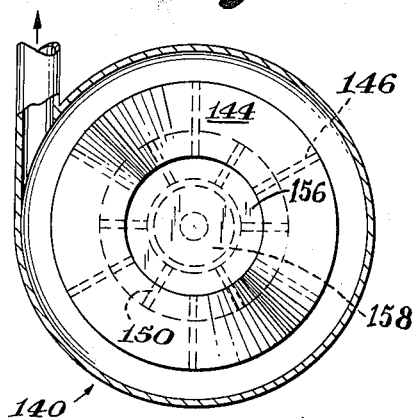
FIGURE 5 is a sectional view taken along line 4—4 of FIGURE 4.

The apparatus shown in FIGURES 4 and 5 is a modified mixer apparatus in accordance with this invention. In this modification, the mixer and a centrifugal pump to supply the liquid to the mixer are combined into a single apparatus. In FIGURE 4, there is shown mixing apparatus indicated generally by the number 120, which comprises a housing 122 having sidewalls which have a concave inner peripheral surface 123, a flat upper end plate 124 and a flat lower end plate 126. Although a concave peripheral sidewall is shown in this embodiment, generally straight peripheral walls of the nature of FIGURE 1 are operable in this modification of the invention.

A coaxially disposed inlet bore 128 is provided in top plate 124 for introduction of particulate solids into the mixer via a hopper or other conduit, as by the force of gravity or by aeration. An inlet bore 130 and mating inlet pipe 132 are centrally disposed in plate 126, coaxially with the longitudinal axis of the housing. An inlet line 134 communicating with inlet bore 132 is disposed within the wall thereof for introduction of liquid to the mixer.

A double-faced impeller 140 is disposed within housing 122 coaxially with the longitudinal axis of the housing. The impeller 140 has a central base plate 142, an upper generally frusto-conically shaped plate 144 having a coaxial bore therein which is the size of the bore 128. The plate 144 is spaced above the base plate 142 and has an array of radial vanes 146 extending between it and the base plate. A similarly shaped frusto-conical plate 148, of smaller diameter than the diameter of the plate 144, is spaced from the opposite side of the base plate 142 by an array of radial vanes 150.

A bore 156 is disposed centrally in the upper plate 144, forming an eye giving communication between the solids inlet bore 128a and the passageways between the vanes 146 in the interior of the impeller 140.

A bore 158 is disposed centrally in the lower plate 148 forming an eye giving communication between the liquid inlet bore 130 and the passageways between the vanes 148 in the interior of the impeller 140.

A shaft 164 disposed coaxially with the longitudinal axis of the impeller 140 passes through the central bore of plate 148 and connects with the base plate 142 at the central point thereof and extends through bore 130, inlet 132 and packing gland and bearing 166 to the exterior of the mixer housing. Shaft 164 is stabilized as by bearing 168 and is rotationally driven by motor 170 which in consequence, rotates the impeller 140 within the housing 122.

Figure 6:
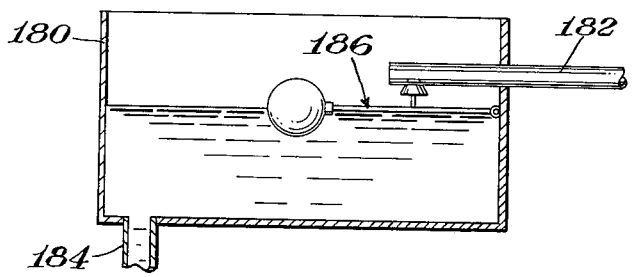
FIGURE 6 is a sectional view of an alternative means of supplying liquid to the mixing apparatus.

FIGURE 6 shows an alternative liquid supply system for the mixer which may function in place of the centrifugal pump. In FIGURE 6 there is shown a reservoir 180 with liquid inlet pipe 182 and liquid outlet pipe 184. Inlet line 182 terminates within reservoir 180 in a conventional float controlled shut off valve 186 whereby the level of liquid in the reservoir 180 is maintained fairly constant by incoming liquid from inlet 182. When the liquid level in the tank drops, as when liquid is supplied to the mixer, the valve opens and further liquid is admitted. When the reservoir is filled, the float causes the valve 186 to close preventing further entrance of liquid.

It will be recognized that the combination of the centrifugal pump with the mixer into a single housing has the effect of the pump delivering the liquid into the mixer at all points of housing of the mixer. In contrast in the embodiment of the invention shown by FIGURE 1, the liquid is delivered to the mixer essentially at one area of the housing, namely the inlet 14. It is within the scope of this invention to modify the embodiment of FIGURE 1 by the use of a plurality of inlets, spaced as desired around housing 12, with the ultimate being the equivalent of the combination pump and mixer embodiment as in FIGURE 4. The plurality of inlets may branch from the delivery conduit of a single pump, or may derive from a plurality of pumps, such as in instances when it is desirable to mix more than one liquid by the mixer.

In starting the operation of the mixer illustrated in FIGURE 1, normally rotation of the impeller is begun with no flow of liquid or solids. The liquid phase is first introduced followed by introduction of the solids. The density control potentiometer is set to establish and hold the ratio of solids to liquid desired in the resulting mixture.

Ordinarily the mixer is operated at more or less constant speed, with the actual speed being matched to the specific design of the mixer. The mixer operates most efficiently if driven within roughly 20 percent of the design speed and rate of mixing is regulated by a valve 88 on the mixture output line. The valve simply is opened proportionally to the rate of delivery desired.

If desirable, the flow of solids to the mixer may be discontinued at any time and the flow of liquid continued by continuing rotation of the mixer impeller. The liquid phase does not escape from the mixer when this operation is carried out in accordance with the method of this invention.

By the method of this invention, the liquid being mixed is supplied to the mixer at a hydraulic head which is at all times less than the head developed by the impeller 40 of the mixer through the pumping action on the mixed liquid and solids imparted by the rotation of the impeller. The use of a centrifugal pump has been found to be particularly advantageous as a means for delivering the liquid to the liquid inlet of the mixer. The centrifugal pump so used is designed and operated at a predetermined hydraulic relationship with the mixer over the range of deliverabilities of the mixer. This predetermined hydraulic relationship is established through the "shut-off" pressures of the centrifugal pump and the mixer. Thus, the maximum "shut-off" pressure of the pump, i.e., the maximum head or pressure developed by the pump when operating against a closed outlet line and no flow occurring, as determined by the conventional formula, is $$h_s = \left(\frac{D \times N}{1840}\right)^2$$

where $h_s$ is shut-off pressure expressed in feet of water,
D is the diameter of the impeller of the unit in inches,
N is the rotational speed of the impeller in revolutions per minute, and
1840 is a constant taking into account gravitational effects and conversion factors.

The "shut-off" head at the delivery outlet of the mixer is established by the same formula in view of the pumping effect of the impeller.

In operation of the mixer in conjunction with a centrifugal pump as the liquid supply in accordance with this invention, the predetermined hydraulic relationship is such that the value for $h_s$ of the mixer, coded $h_{sm}$ hereinafter, always exceeds that for the centrifugal pump, coded $h_{sp}$ hereinafter, by preferably about 2 percent to 15 percent, with a range of 1 percent to 35 percent more or less, describing a practical range.

It is preferable for more efficient operations for $h_{sm}$ to exceed $h_{sp}$ uniformly by about 2 percent to 15 percent over the entire operating range of the two units, although variations from this range can be tolerated without negating the operability of the system. These limits were determined through tests whereby it was discovered that when $h_{sp}$ is measurably less than $h_{sm}$, the liquid entering the mixer does not flood the housing and impeller, or flow out the passageway leading to the eye of the impeller. However, with a 10 percent to 15 percent differential more or less of $h_{sm}$ over $h_{sp}$, the liquid enters the mixer impeller at the ends of the impeller vanes where it mixes with the incoming solids and is accelerated by the moving vanes to a point whereby enough velocity is established to return it to the duct of the housing. A differential approaching zero has been found to allow needless entrance of the liquid into the impeller vanes with an attendant increase in the power required to operate the impeller as well as an incipient tendency to flood the impeller and ultimately allow flow of liquid from the eye of the impeller. A differential appreciably over about 20 percent decreases the intensive mixing action imparted by the flow and counterflow of the liquid in vane tip area. Furthermore, the development of a large $h_{sm}$ by the impeller of the mixer may cause the introduction of gas, such as air, into the liquid along with the solids. Operation of the mixer impeller to develop a $h_{sm}$ in excess of that of the centrifugal pump has been found in accordance with this invention to enable the mixer to introduce into the liquid those materials of a density equal to or greater than that of the liquid. Materials of a density less than that of the liquid may be introduced if sufficient energy is imparted to them by the mixer impeller in conformance with the relationship $$\text{Kinetic Energy} = 1/2 mv^2$$

where $m$ expresses the mass of the material, and $v$ the velocity.

If the kinetic energy of the introduced material is greater than that of the liquid, mixing will occur, regardless of whether the energy be derived primarily from the mass or from the velocity. With sufficient velocity, a low density material such as air may gain sufficient energy that it is introduced into the liquid.

In the mixing liquids and particulated solids, such as oil and sand in the treatment of petroleum wells, introduction of air into the resulting mixture is generally undesirable. Common practice is pump the mixture of liquid and solids into the well using a piston-type pump wherein presence of gas in the liquid causes faulty operation. In other mixing operations for which the invention may be used, such as preparing drilling muds, entrained air can later escape so it is no problem.

It has been found that although normal operation of the mixer to incorporate particulated solids into a liquid such as crude oil does not introduce air into the resulting slurry, neither do the volatile fractions of the crude oil escape into the atmosphere where such fractions would constitute a fire hazard. It appears that although if such volatile fractions as gases were present in the connecting passageway and eye of the impeller, they would not be drawn into the vanes because of the low density; yet, during operation of the mixer the rotation of the impeller is sufficient to prevent the gases escaping from the liquid.

In the combination of a centrifugal pump with the mixer according to this invention, a lower $h_s$ for the centrifugal pump than for the mixer is achieved by rotating the pump impeller at a slower speed, if the two impellers are of about equal diameter and efficiency, or by using an impeller of smaller diameter (as shown in FIG. 1) for the centrifugal pump than for the mixer if the two are rotated at about the same speed or by using an impeller of less capacity or less efficiency for the pump. Other methods of design to achieve this relationship will be apparent to those familiar with the design and operation of centrifugal pumps and may be used to establish and maintain a constant and preferably fairly uniform differential between the $h_s$ of pump and that of the mixer over the capacity range of the system.

Mixer units in accordance with this invention may be operated with the impeller of the mixer being supplied with liquid from pumps, such as displacement pumps, gear pumps and others, as well as centrifugal pumps. However, the use of centrifugal pumps to supply liquid to the centrifugal mixer has been found to add another advantage when used in combination with the mixer. When using the mixer for making a liquid-solids slurry for use in treating wells, the slurry is normally piped from the mixer to piston pumps, which in turn force the slurry down the well and deeply into fractures in the earth formations at high pressures. Often in the process of pumping into the well, it is necessary to suddenly stop the piston pumps, such as to change the gear ratio in the power train to the pump or in case the well becomes plugged. With a centrifugal pump supplying the mixer, and the mixer supplying the piston pump, the piston pump may be interrupted temporarily or shut down for extended periods without oversupply from the mixer becoming a problem. The mixer and the related impeller are not a positive displacement system, and if the mixture cannot leave, the impeller may continue to rotate harmlessly with the development of only the designed shut-off pressure. Likewise the centrifugal liquid feed pump may continue to operate and supply liquid to the inlet of the mixer without creating an oversupply problem. The pump supplies the fluid at the design shut-off pressure, which is, when the centrifugal pump is matched in accordance with the invention with the mixer to have a lower $h_s$ than that of the mixer, insufficient to cause liquid to flow into the mixer impeller and from there to the hopper. In this respect the combination of mixer and centrifugal pump solves a long-standing problem since control of the mixing of liquid and solids during the treatment of petroleum wells to prevent overflow when the liquid is flammable is most essential.

Varieties of centrifugal pumps, such as turbine pumps and axial flow pumps, are desirable for use in combination with the mixer, since again such varieties can be used without creating a possible overflow problem if the outlet from the mixer is closed. A reservoir of preferably nearly constant head, as shown in FIGURE 6, supplying liquid at a pressure head less than that developed by the impeller of the mixer, but usually not more than about ⅓ less, is also a satisfactory source of liquid for supplying the mixer. Such a source fulfills the need for a liquid source having a positive pressure head, but one which automatically cannot overflow the mixer during operation. It should be recognized that positive displacement pumps used in conjunction with the mixer can be automated by mechanical, electrical or hydraulic overriding controls to shut down the liquid supply from them if the outlet from the mixer is closed, and thereby also function with the mixer without overflow of the mixer taking place.

The data in Table I characterize the pressure relationship between the mixer and a centrifugal pump where the performance of the pump is matched, in accordance with the method of mixing of this invention, to the liquid requirements of the mixer. The data are from test runs to the invention wherein gauges to determine the pounds per square inch pressure were mounted on a mixer of the embodiment shown by FIGURE 1, near the junctures of the inlet 14 and outlet 16 with the housing 12. The mixer in this instance was constructed with a housing having an inside diameter of about 30 inches, a liquid inlet and mixture outlet both of about 6 inches diameter, and a conduit 28 for particulate solids about 10 inches in diameter. The impeller was about 20 inches in diameter with a thickness at the eye of about 6 inches. The impeller opening at the eye was about equal to the diameter of conduit 28. A conventional centrifugal pump was employed with the mixer.

Water and sand were mixed in test runs. Power was applied to mixer and the pump and the water and sand were admitted to the mixer in various proportions, as shown in Table I, while readings were made of the inlet and outlet pressure gauges.

Table I

| Run | P.s.i. Gauge, Mixer Inlet | P.s.i. Gauge, Mixer Outlet | Percentage Excess of Mixer Outlet Pressure Over Inlet Pressure | Mixing Rate, Gallons Per Minute Water | Pounds Sand Per Gallon Water in Produced Mixture |
| --- | --- | --- | --- | --- | --- |
| 1 | 25 | 28 | 12 | 2,200 | 0.15 |
| 2 | 25 | 28 | 12 | 1,950 | 1.3 |
| 3 | 24 | 26.5 | 10 | 1,550 | 3.5 |
| 4 | 22 | 23 | 4.5 | 1,300 | 6.0 |

Observation of the mixture produced at the mixer outlet showed a uniform and homogenous product was created by the mixer in the tests of Table I. No clogging of the impeller or housing occurred. During another test similar to Run 3 of Table I, a valve attached to outlet line 16 was closed, rotation of impeller 40 was continued and operation of the centrifugal pump to supply fluid was continued. It was found that, although liquid was thus supplied to the mixer, no back flow of liquid through the eye of impeller 40 occurred, and consequently no overflow of liquid out of the entire system took place.

The following operation of mixing a slurry for fracture stimulation treatment of a West Texas oil well is illustrative of the practice of the invention. The well was treated by displacing down the casing of the well about 36,000 gallons of water into which was mixed 72,000 pounds of sand and 1700 pounds of powdered guar gum, the guar gum being added to thicken the water somewhat. The size of the sand grains was such that all would pass a 10 mesh sieve, U.S. Sieve Series, and be retained upon a 20 mesh sieve, while the guar gum would pass a 200 mesh sieve. When the treatment was performed, the water was fed from supply tanks to the centrifugal pump which, in turn, pumped the water to the inlet of a mixer construction in accordance with this invention. The centrifugal pump and mixer used were that utilized in the tests of Table I wherein the centrifugal pump was of such capacity and was so operated that it developed a shut-off pressure about 5–15 percent less than that developed by the impeller of the mixer. As the water was introduced into the inlet of the mixer, the sand and guar gum, at a ratio of two pounds of sand to each gallon of water, and the amount of gum being in proportion, were fed into the hopper of the mixer. The water and sand-gum mixture were mixed continuously at a rate of about 2330 gallons per minute of mixed product, which flowed under the output pressure from the mixer through branching conduit hoses to the intakes of three triplex pumps. These latter pumps displaced the water-sand-gum mixture into the casing of the well and therefrom into the earth formations to effect treatment of the well.

As a furher example of the practice of the invention, another petroleum well in West Texas was treated employing the centrifugal pump and mixer used in the prior example to mix about 21,000 gallons of a semi-refined oil having a viscosity of about 400 centipoises with 42,000 pounds of sand (having a mesh size of passing 10 mesh, retained on 20 mesh sieve, U.S. Sieve Series), and, in proportion, 550 pounds of a powdered dry solid fluid-loss additive of a composition conforming to U.S. Patent 2,779,735. The mixing was accomplished uniformly at the rate of 365 gallons mixture per minute, with the resulting slurry flowing from the mixer to the intake of three triplex piston displacement pumps whereby the slurry was pumped into the well and thence into fractures in the earth.

Other instances of the use of the mixer in combination with a centrifugal pump to satisfactorily mix materials for well treatments are shown in the following Table II.

*Table II*

| Run | Gallons Liquid Mixed | Particulate Solids Mixed | Mixing Rate, Gallons Per Minute Liquid | Pounds Solids Per Gallon Liquid in Produced Mixture |
|---|---|---|---|---|
| 5 | 20,000 gallons Crude Oil | 20,000 pounds 20-40 mesh sand | 765 | 1 |
| 6 | 20,500 gallons water | 20,500 pounds 10-20 mesh with 1,700 pounds powdered Guar Gum. | 545 | 2 |
| 7 | 11,200 gallons 15% Hydrochloric Acid thickened with Guar Gum. | 16,800 pounds 20-40 mesh sand | 295 | 1½ |

The examples demonstrate in part the range and manner of operating the invention. It has been found the apparatus operates effectively over a wide range of oprating conditions. For example, the mixer has, on test, mixed at a liquid feeding rate from zero to as high as 3000 gallons per minute. Although the examples cited are concerned with mixing liquids and particulate solids for stimulation treatments of wells, the invention is also adaptable to mixing other liquids and other solids, including other sizes both larger and smaller, including, for example water and cement, water and drilling mud components and oil and oil-base drilling mud components.

What is claimed is:

1. A method of mixing a pumpable liquid and a particulate material comprising
   introducing said liquid to a mixing zone under a measurable hydraulic head,
   swirling said liquid to impart a rotary motion to said liquid whereby the liquid acquires an angular velocity with respect to the center of rotation of the liquid,
   introducing particulate material at least near to the center of rotation of said liquid,
   rotationally slinging said particulate material to impart a linear velocity substantially equal to the tangential velocity of the rotating liquid and to inject said particulate material into said rotating liquid and forthwith moving from the mixing zone the resulting mixture with a power imparted hydraulic head exceeding said measurable hydraulic head.

2. A method in accordance with claim 1 wherein the hydraulic head of the resulting mixture exceeds the measurable hydraulic head by about 2 to 20%.

3. A method in accordance with claim 1 wherein the measurable hydraulic head is subject to an upper limit determined by a designed shut-off pressure.

4. A method in accordance with claim 1, wherein said particulate material is an earth formation propping agent and said liquid is a petroleum oil.

5. A method in accordance with claim 1, wherein said particulate material is an earth formation propping agent and said liquid is brine.

6. A method in accordance with claim 1, wherein said particulate material is an earth formation propping agent and said liquid is water.

7. A method in accordance with claim 1, wherein said particulate material is cement and said liquid is water.

8. A method of mixing a pumpable liquid and a particulate material comprising
   introducing said liquid at a measurable hydraulic head of pressure to a circular mixing zone,
   swirling said liquid by applied power to increase the measurable hydraulic head pressure and to impart an angular velocity,
   introducing particulate material substantially at the center of said circular mixing zone,
   swirling said particulate material to accelerate it to an angular velocity like that of said liquid whereby the particulate material and the liquid commingle and
   moving the resulting mixture from said mixing zone.

9. A method of adding a particulate material to a pumpable liquid comprising
   introducing said liquid at a measurable hydraulic head of pressure into a circular case containing an impeller,
   applying power to said impeller to cause rotational flow of said liquid and develop a hydraulic head of pressure greater than said measurable hydraulic head of pressure and
   introducing substantially to the eye of said impeller a particulate material whereby said material is injected into said liquid and forthwith
   pumping from said circular case commingled liquid and solid.

10. A method of adding a particulate material to a pumpable liquid comprising
    introducing said liquid to a first rotating powered impeller within a circular case to develop a measurable hydraulic head in said liquid,
    flowing said liquid to a second rotating powered impeller within said case to increase said measurable hydraulic head in said liquid,
    introducing substantially to the eye of said second impeller a particulate material whereby said material is injected into said liquid with increased hydraulic head and forthwith
    pumping intermixed liquid and particulate material from said circular case.

References Cited by the Examiner

UNITED STATES PATENTS

| | | | |
|---|---|---|---|
| 2,147,053 | 2/1939 | Owsley | 259—151 |
| 2,626,788 | 1/1953 | Ragland | 252—7 |
| 2,736,534 | 2/1956 | Atkins | 259—8 |
| 2,779,735 | 1/1957 | Brown et al. | 252—8.55 |
| 2,924,439 | 2/1960 | Dutton | 259—7 |
| 2,965,362 | 12/1960 | Flottmann et al. | 259—8 |
| 3,096,284 | 7/1963 | Slate | 252—8.55 |

JULIUS GREENWALD, *Primary Examiner.*

ALBERT T. MEYERS, *Examiner.*

H. B. GUYNN, *Assistant Examiner.*